(12) United States Patent
Probst et al.

(10) Patent No.: US 11,028,896 B2
(45) Date of Patent: Jun. 8, 2021

(54) RAIL BRAKE DAMPER

(71) Applicant: Stabilus GmbH, Koblenz (DE)

(72) Inventors: Ulrich Probst, Hillscheid (DE); Lars Löhken, Bonn (DE); Raphael Piroth, Koblenz (DE); Markus Müller, Koblenz (DE)

(73) Assignee: STABILIUS GMBH, Koblenz (DE)

( * ) Notice: Subject to any disclaimer, the term of this patent is extended or adjusted under 35 U.S.C. 154(b) by 321 days.

(21) Appl. No.: 16/305,459

(22) PCT Filed: Jul. 12, 2017

(86) PCT No.: PCT/EP2017/067563
§ 371 (c)(1),
(2) Date: Nov. 29, 2018

(87) PCT Pub. No.: WO2018/011272
PCT Pub. Date: Jan. 18, 2018

(65) Prior Publication Data
US 2020/0325956 A1 Oct. 15, 2020

(30) Foreign Application Priority Data
Jul. 12, 2016 (DE) ...................... 10 2016 212 654.7

(51) Int. Cl.
*B61K 7/02* (2006.01)
*F16F 9/52* (2006.01)
(Continued)

(52) U.S. Cl.
CPC ................. *F16F 9/52* (2013.01); *B61K 7/02* (2013.01); *B61K 7/025* (2013.01); *F16F 9/348* (2013.01); *F16F 9/56* (2013.01); *F16F 9/5126* (2013.01)

(58) Field of Classification Search
CPC .. F16F 9/348; F16F 9/3488; F16F 9/34; F16F 9/3405; F16F 9/523; B61K 7/02; B61K 7/025
See application file for complete search history.

(56) References Cited

U.S. PATENT DOCUMENTS 2,472,841 A * 6/1949 Ochs ....................... F16F 9/348
188/282.8
2,638,339 A 5/1953 Taylor
(Continued)

FOREIGN PATENT DOCUMENTS

DE 3119861 5/1981
DE 3120016 12/1982
(Continued)

OTHER PUBLICATIONS

International Search Report filed in PCT/EP2017/067563 dated Oct. 13, 2017.
(Continued)

*Primary Examiner* — Nicholas J Lane
(74) *Attorney, Agent, or Firm* — Rankin, Hill & Clark LLP

(57) ABSTRACT

A rail brake damper includes a cylinder-piston arrangement. A damping device assigned to the piston comprises at least one damping valve having at least one piston channel, which passes through the piston, connecting the two operating chambers of the cylinder, and a closure element assigned to the piston channel. The closure element is spring pre-loaded with the effect of closing the piston channel and is acted on by the hydraulic pressure which prevails in the operating chamber facing away from the piston rod with the effect of opening the damping valve.

15 Claims, 5 Drawing Sheets

(51) Int. Cl.
*F16F 9/348* (2006.01)
*F16F 9/56* (2006.01)
*F16F 9/512* (2006.01)

(56) References Cited

U.S. PATENT DOCUMENTS

| | | | | |
|---|---|---|---|---|
| 3,040,676 | A * | 6/1962 | Checkley | B61K 7/00 |
| | | | | 104/162 |
| 3,103,993 | A * | 9/1963 | Gies | F16F 9/42 |
| | | | | 188/274 |
| 3,637,052 | A * | 1/1972 | Bick | B61K 7/025 |
| | | | | 188/62 |
| 4,203,507 | A | 5/1980 | Anno | |
| 4,474,271 | A * | 10/1984 | Molders | B61K 7/025 |
| | | | | 188/280 |
| 4,721,189 | A * | 1/1988 | Bick | B61K 7/025 |
| | | | | 188/62 |
| 5,092,248 | A * | 3/1992 | Parry | B61K 7/02 |
| | | | | 104/26.2 |
| 5,730,260 | A * | 3/1998 | Thyssen | B61K 7/025 |
| | | | | 188/266.5 |
| 5,829,556 | A * | 11/1998 | Domange | E04H 9/021 |
| | | | | 188/268 |
| 6,182,575 | B1 * | 2/2001 | Liu | B61K 7/025 |
| | | | | 104/26.2 |
| 6,199,671 | B1 * | 3/2001 | Thyssen | B61K 7/025 |
| | | | | 104/26.2 |
| 6,216,525 | B1 * | 4/2001 | Bernd | B61K 7/025 |
| | | | | 73/11.06 |
| 6,520,298 | B1 * | 2/2003 | Meuters | B61K 7/025 |
| | | | | 104/26.2 |
| 2005/0205364 | A1 * | 9/2005 | Browne | F15B 21/065 |
| | | | | 188/31 |
| 2017/0114856 | A1 * | 4/2017 | Yoshida | F16F 9/185 |

FOREIGN PATENT DOCUMENTS

| | | |
|---|---|---|
| DE | 19604721 | 8/1996 |
| FR | 2 562 971 | 10/1985 |

OTHER PUBLICATIONS

German Search Report filed in Application No. 102016212654.7 dated May 8, 2017.

* cited by examiner

RAIL BRAKE DAMPER

The invention relates to a rail brake damper comprising a cylinder-piston arrangement having a cylinder, a piston that is guided in the cylinder in an axially movable manner and divides the inner chamber of the cylinder into two working chambers, a piston rod connected to the piston and guided out of the cylinder at one end thereof in a sealed manner, an ejector arrangement, which acts on the piston in such a manner as to slide the piston rod out of the cylinder, and a damping device associated with the piston.

When positioning wagons at track ends, in particular in goods distribution centres, a problem arises whereby subsequently bumping wagons push those that have already been coupled to a train and these tend to start moving again.

At track ends for example, this may lead to the wagons inadvertently being pushed against a buffer. In the worst case, there is even the risk of the wagon derailing. In addition, on continuous tracks, i.e. tracks having an open track end, it is undesirable for a wagon to leave the track before all the wagons of the train have been completely coupled together. Lastly, a third application involves tracks in marshalling yards, in which the wagons are separated between different tracks. Here too, it is undesirable for the wagons to move independently.

Over time, these problems have become increasingly critical since, for example, friction in the axial bearings of the wagons has been optimised in the meantime to the extent that the wagons are no longer braked by friction.

The generic patent DE 31 20 016 C2 discloses a shock absorber that generates practically no brake action when the wagon is travelling at very low speeds or is almost stationary, and is only activated above a predetermined over-run speed. Therefore, this absorber is not capable of solving the aforementioned problem. Additional braking systems must thus be provided for low over-run speeds and almost stationary conditions.

Against this background, the problem addressed by the invention is that of disclosing a rail brake damper of the type mentioned at the outset that can overcome the problems discussed above.

According to the invention, this problem is solved by a rail brake damper that comprises a cylinder-piston arrangement having a cylinder, a piston that is guided in the cylinder in an axially movable manner and divides the inner chamber of the cylinder into two working chambers, a piston rod connected to the piston and guided out of the cylinder at one end thereof in a sealed manner, an ejector arrangement, which acts on the piston in such a manner as to slide the piston rod out of the cylinder, and a damping device associated with the piston, and in which the damping device comprises at least one damping valve having at least one piston channel which passes through the piston, thereby connecting the two working chambers, and at least one closure element associated with the piston channel, the at least one closure element being spring-biased in such a manner as to close the piston channel, and the hydraulic pressure active in the working chamber remote from the piston rod acting on said element in such a manner as to open the damping valve.

If a wagon collides slowly with the free end of the piston rod and attempts to push the piston into the cylinder, the at least one piston channel initially remains closed by the at least one closure element under the effect of the spring bias. In the process, the closure force of the spring bias is selected such that the at least one closure element is only lifted off the piston when a predetermined force, which is still smaller than the force that would cause the wagon to derail, is applied to the piston rod. Until the at least one closure element is lifted off the piston, the rail brake damper acts as a solid obstruction capable of holding the wagon in place. If the predetermined force has been exceeded, i.e. after the at least one closure element has been lifted off the piston, hydraulic fluid can flow from the working chamber remote from the piston rod, through the at least one piston channel and into the working chamber close to the piston rod, such that the piston can be moved into the cylinder. The resistance applied by the damping valve counter to the flow of the hydraulic fluid brakes the wagon.

At low over-run speeds and under almost stationary conditions, the rail brake damper according to the invention thus forms a solid obstruction capable of holding the wagon in place. If, however, a predetermined over-run speed, or more specifically a predetermined force exerted by the wagon on the rail brake damper, is exceeded, the rail brake damper acts as a damping element that brakes the movement of the wagon.

In principle, it is conceivable for the at least one closure element to itself provide the spring bias, for example by being formed as a spring element.

However, in a development of the invention, it is preferable for the at least one closure element to be spring-biased by means of at least one separate valve-biasing spring in such a manner as to close the piston channel. In the process, the at least one closure element can be formed for example as a ball, a frustum of a cone, a cone, a sealing disc or a valve spool.

Depending on the specific application in each case, the at least one closure element can be made of metal, for example steel or copper, or of plastics material, for example polytetrafluoroethylene (PTFE).

The opening behaviour of the damping device during pressurised operation, i.e. when the piston rod is retracting into the cylinder, is determined by the interaction between the force directed in the opening direction and the force directed in the closure direction. In this respect, the force directed in the opening direction of the at least one damping valve is calculated as the product of the hydraulic pressure active in the working chamber remote from the piston rod, and the total cross-sectional area of the at least one piston channel. The force directed in the closure direction can generally be calculated as being equal to the spring bias since, when a goods wagon is acting on the piston rod, the hydraulic pressure active in the working chamber containing the piston rod is negligible compared with the hydraulic pressure active in the working chamber remote from the piston rod. If a plurality of valve-biasing springs is provided, the force directed in the closure direction is calculated as the sum of the spring biases of the valve-biasing springs.

In principle, all possible combinations of piston channels and valve-biasing springs are conceivable. For example, a plurality of piston channels could be provided, a separate valve-biasing spring acting on their respective associated closure element elements. By means of a damping device formed in this manner, staggered opening behaviour could be provided, in which the damping device does not open abruptly when a predetermined pressure limit is exceeded, but rather a pre-opening occurs first, for example of just one piston channel, before all the piston channels are eventually released.

The at least one valve-biasing spring can act directly on the associated closure element. However, it is also conceivable for the at least one valve-biasing spring to act on the associated closure element by means of a support element.

It is even possible for a valve-biasing spring to act on a plurality of closure elements by means of one support element.

Accordingly, in a development of the invention, a plurality of piston channels connecting the working chambers can pass through the piston and each can be associated with a separate closure element, the closure elements being associated with a common support plate, on which the valve-biasing spring acts. This makes it possible to set the damping force desired in each case by selecting a suitable number and cross-sectional area for the piston channels, in accordance with the valve-biasing springs used in each case. For example, the valve-biasing spring can be formed by a disc spring assembly.

To allow the valve-biasing spring to move together with the piston rod, it is proposed that the valve-biasing spring is supported against an element that is operatively connected to the piston rod. The element operatively connected to the piston rod can, for example, be a sleeve that can be connected to the piston rod, for example by crimping.

In the context of the present invention, the element operatively connected to the piston rod can also fulfil another function. Specifically, its end facing away from the valve-biasing spring can be used to engage with a limit stop spring, which can also be designed as a disc spring assembly. The role of this limit stop spring is to absorb within the limit stop the impact energy by which the piston rod and piston spring upwards when the wagon releases the damper again.

As is known per se, the cylinder-piston arrangement can also comprise a gas-filled equalisation space. The gas within said equalisation space can be compressed when the piston rod is moved into the cylinder, thus providing space for the volume of hydraulic fluid displaced by the piston rod.

In a development of the invention, it is proposed that, adjacently to the end of the cylinder at which the piston rod exits the cylinder, an insert element is arranged in the working chamber close to the piston rod and said element, at least at its end facing the piston, surrounds the piston rod or an element connected thereto, thereby leaving a gap. The gas-filled equalisation space can be provided in said insert element. In this case, the fact that the insert element reaches the piston rod apart from leaving a gap ensures that flow turbulence caused by the hydraulic fluid exiting the piston channels at high speed cannot affect the gas filling of the equalisation space, in particular cannot cause the hydraulic fluid to foam by means of the gas filling. Only an amount of hydraulic fluid corresponding to the volume of the portion of the piston rod that has moved into or out of the cylinder flows through the gap left between the piston rod and insert element. Due to this relatively low amount of hydraulic fluid, there is no risk of foaming.

Another function of the insert element may be to provide support for the limit stop spring. In addition, the insert element can also be used as the stop for the valve-biasing spring, such that it can assist the action of the limit stop spring.

To allow the piston rod to be moved back out of the cylinder, it is proposed in a development of the invention that the damping device comprises at least one additional damping valve having at least one additional piston channel, which passes through the piston in such a manner as to connect the two working chambers, and at least one additional closure element associated with the additional piston channel, the at least one additional closure element being spring-biased by at least one additional valve-biasing spring in such a manner as to close the at least one additional piston channel, and the hydraulic pressure active in the working chamber through which the piston rod passes acting on said element in such a manner as to open the at least one additional damping valve. In the process, the damping force of the at least one additional damping valve is preferably selected such that, on one hand, the extended state of the piston rod and thus the operational readiness state of the rail brake damper can be restored as quickly as possible after the wagon has released the rail brake damper again, and, on the other hand, the impact energy of the piston rod and piston is limited to a value that does not impair the long service life of the rail brake damper.

In this case too, it is possible for a plurality of additional piston channels connecting the working chambers to pass through the piston and for each to be associated with a separate additional closure element, the additional closure elements being associated with an additional common support plate, on which the additional valve-biasing spring acts. In principle, the possible variants explained above for the at least one damping valve are also possible for the components of the at least one additional damping valve.

The opening behaviour of the damping device during ejection operation, i.e. when the piston rod is being moved out of the cylinder, is determined by the interaction between the force directed in the opening direction of the at least one additional damping valve and the force directed in the closure direction. In this respect, the force directed in the opening direction is calculated as the product of the hydraulic pressure active in the working chamber containing the piston rod, and the total cross-sectional area of the at least one additional piston channel. Due to the action of the ejector apparatus, the force directed in the closure direction can generally be calculated as being equal to the spring bias of the at least one additional valve-biasing spring. If a plurality of additional valve-biasing springs is provided, the force directed in the closure direction is calculated as the sum of the spring biases of the additional valve-biasing springs.

For example, the at least one additional valve-biasing spring can be formed by a helical spring, for example a helical compression spring, a disc spring or the like. In addition, the at least one additional valve-biasing spring can be supported against an element that is operatively connected to a piston rod portion that passes through the piston. By way of example, this element can be a plate that is screwed, by means of a nut, to the piston rod end arranged in the cylinder.

In a development of the invention, it is proposed that the ejector arrangement comprises at least one ejector spring, for example at least one helical compression spring and/or at least one disc spring arranged in the working chamber remote from the piston rod, and/or at least one compressed-gas volume. In principle, the compressed-gas volume that must be provided anyway would be sufficient to equalise the volume taken in by the piston rod when being slid into the cylinder and the volume released again when said rod extends out of the cylinder. After the piston rod has slid in while a goods wagon moves over it, if the at least one additional damping valve remains closed preventing any hydraulic fluid from being exchanged between the working chambers, a state would be produced in which the piston is stationary. In this state, there would be a higher pressure in the working chamber housing the piston rod than in the working chamber remote from the piston rod. This is caused by the fact that, due to the surface area taken up by the cross section of the piston rod, the piston features a smaller surface area for the working chamber housing the piston rod than for the working chamber remote from the piston rod. If the at least one additional damping valve is of such a design and size that the pressure difference between the two working chambers is sufficient to open the at least one additional damping valve, the aforementioned state cannot be produced and the piston rod will be continuously ejected. In this context, the pressure volume ensures that the value of the pressure is kept approximately at a level that ensures efficient ejection of the piston rod from the cylinder. The efficient ejection of the piston rod can also be assisted by the ejector arrangement comprising an ejector spring arrangement, which can comprise two helical compression springs nested together, for example.

For the energy dissipated during operation of the rail brake damper to be carried away to the exterior in a simple manner, the cylinder can be formed to have cooling ribs on its outer surface.

In a development of the invention, it is proposed that the cylinder-piston arrangement is received in a housing that comprises a bottom part associated with the cylinder, and a cover part that is associated with the piston rod and is displaceable relative to the bottom part.

In a lower boundary surface of the bottom part, at least one opening can be provided, through which the air present in the housing can be driven out when the cover part is retracted into the bottom part and fresh air can be sucked into the housing when the cover part is extended out again. As a result, an air flow that moves past the cooling ribs of the cylinder is formed in the housing, thus ensuring effective cooling of the cylinder-piston arrangement. This is particularly important because the rail brake damper absorbs so much energy per working stroke that it heats up by approximately 1.0° K to 1.5° K. In view of the high number of wagons that a goods train may have, and due to the fact that each wagon typically comprises up to four axles, it is clear to see that effective cooling of the rail brake damper is essential.

If the wagons have been coupled to a goods train on a track, they are moved off the track by a shunting locomotive. This involves a high number of rail brake damper activations in a very short time, and thus entails a risk of the rail brake damper overheating and thus being damaged, if not destroyed. The motoring power of the shunting locomotive required to activate the rail brake dampers is also a drawback.

To address this problem, it has already been proposed in the prior art to fold away the entire rail brake damper to the side or to axially retract it in order to prevent it being activated when the goods train is moved off the relevant track.

However, these embodiments are all structurally complex, in particular because the folding or retraction mechanism must be designed to be able to withstand the activation forces occurring during normal operation.

To solve this problem, it is proposed in a development of the invention that the damping device comprises a damping-force reduction device associated with the at least one damping valve, in particular a damping-force reduction device designed to reduce the damping force of the at least one damping valve when the temperature of the rail brake damper increases. A lower damping force when the piston rod is being slid into the cylinder also results in lower energy dissipation and lesser heating of the rail brake damper.

If the damping force continuously drops as the temperature increases, a limit of the rail brake damper operating temperature may be reached. In this respect, the damping-force reduction device associated with the at least one damping valve can comprise, by way of example, an adjustment apparatus that adjusts automatically when the temperature changes. For example, an adjustment apparatus of this kind can be formed of a shape-memory metal unit and/or an expansion wax unit. This design of the adjustment apparatus is also advantageous in that the rail brake damper can be formed as a self-contained, autonomously operating unit that has no ports for energy and/or signal supplies.

In principle, however, it is also possible for the damping-force reduction device associated with the at least one damping valve to comprise an adjustment apparatus that can be actuated electrically and/or in a motorised manner and/or electromagnetically and/or pneumatically and/or hydraulically. An adjustment apparatus of this kind can, for example, be actuated before the shunting locomotive begins moving the goods train off the relevant track. By means of an adjustment apparatus of this kind, it is also possible to reduce the damping force of the at least one damping valve to substantially zero, for example by opening a bypass between the two working chambers of the cylinder or a substantially damping-free line leading from the working chamber remote from the piston rod to a buffer container.

In addition or alternatively, however, the damping device can also comprise a damping-force increasing device associated with the at least one additional damping valve, in particular a damping-force increasing device designed to increase the damping force of the at least one additional damping valve when the temperature of the rail brake damper increases.

As regards the adjustment apparatus for actuating the damping-force increasing device, reference can be made to the above explanations regarding the adjustment apparatus for actuating the damping-force reduction device.

By means of a damping-force increasing device of this kind, the extension movement of the piston rod after the rail brake damper has been actuated can be slowed down. This can ensure that said rod is not yet completely extended again at the start of the next actuation, meaning that less energy is accordingly dissipated during the next actuation, which in turn leads to the rail brake damper heating up less. If the damping force of the at least one additional damping valve is increased substantially infinitely, an extension movement of the piston valve can be substantially entirely prevented.

In addition or alternatively, however, said damper can also comprise a locking apparatus designed to hold the unit formed by the piston and piston rod in a state in which the piston rod is retracted into the cylinder. A locking apparatus of this kind can also prevent an extension movement of the piston rod.

As regards the adjustment apparatus for actuating the locking apparatus, reference can again be made to the above explanations regarding the adjustment apparatus for actuating the damping-force reduction device.

The invention will be described in more detail hereinafter on the basis of an embodiment with reference to the accompanying drawings, in which.

Figure 4A:
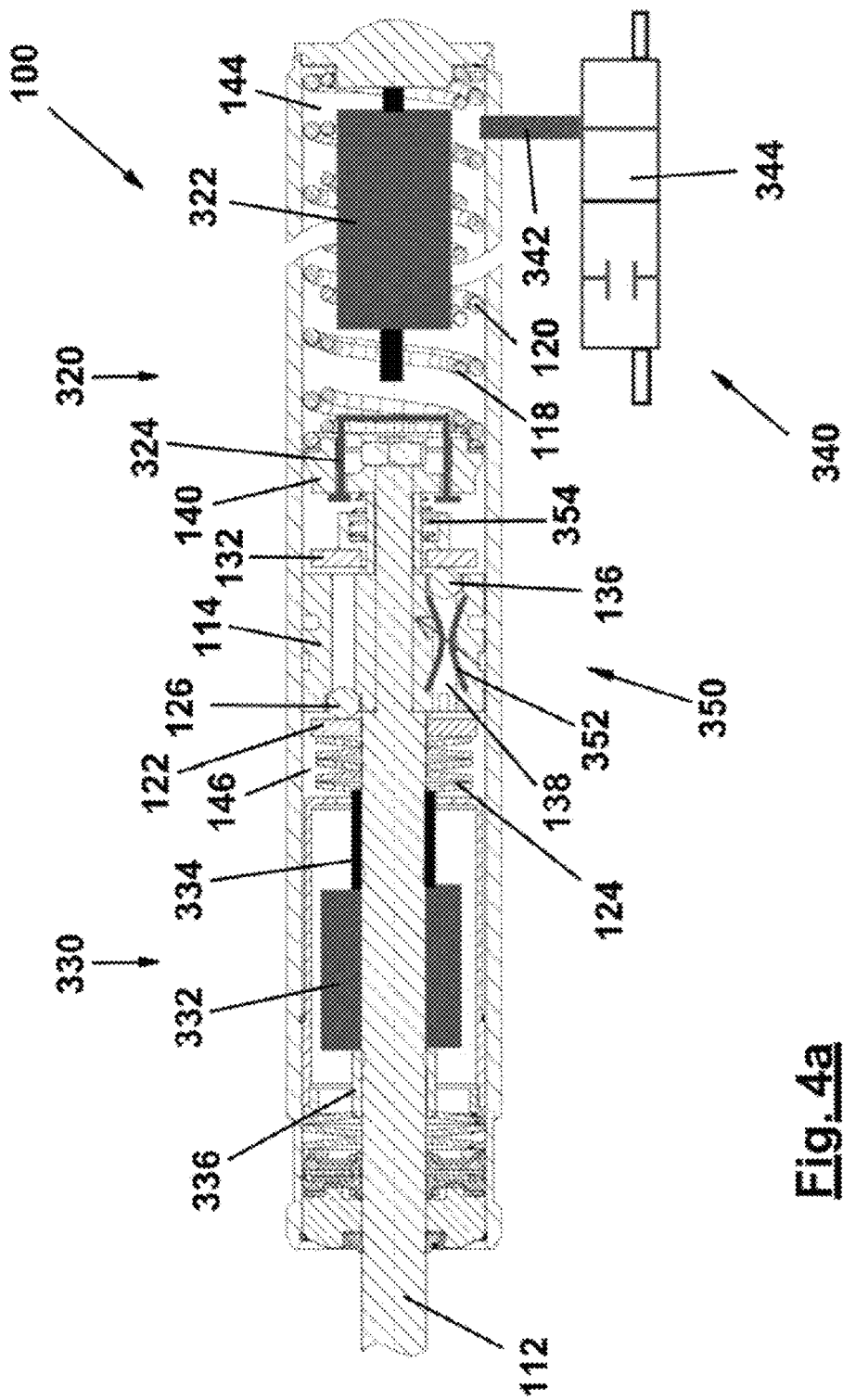
Figure 4B:
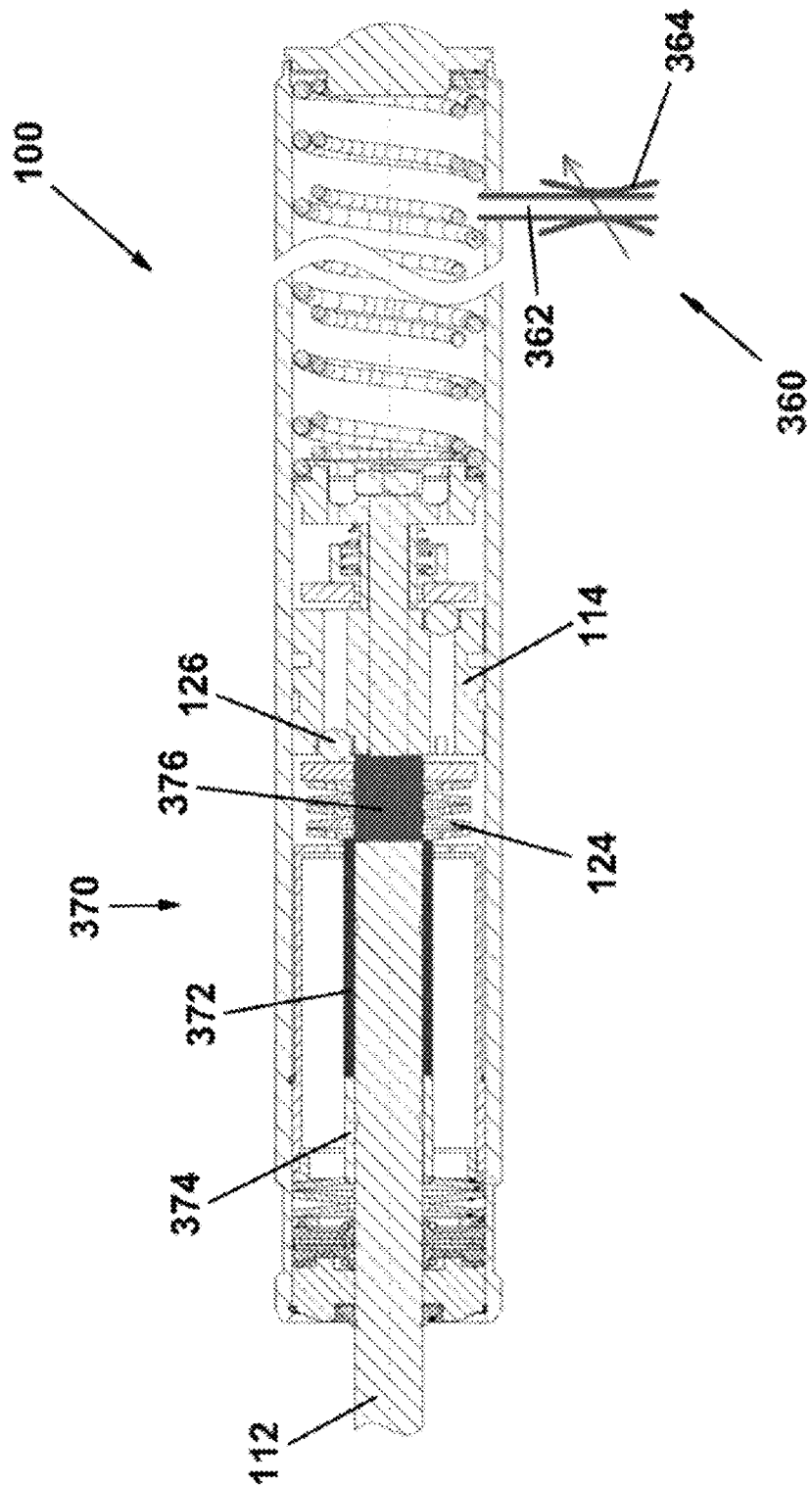

FIGS. 4*a* and 4*b* are sectional views of the rail brake damper according to the invention, showing different embodiments of ancillary apparatuses for preventing the rail brake damper from overheating.

Figure 1:
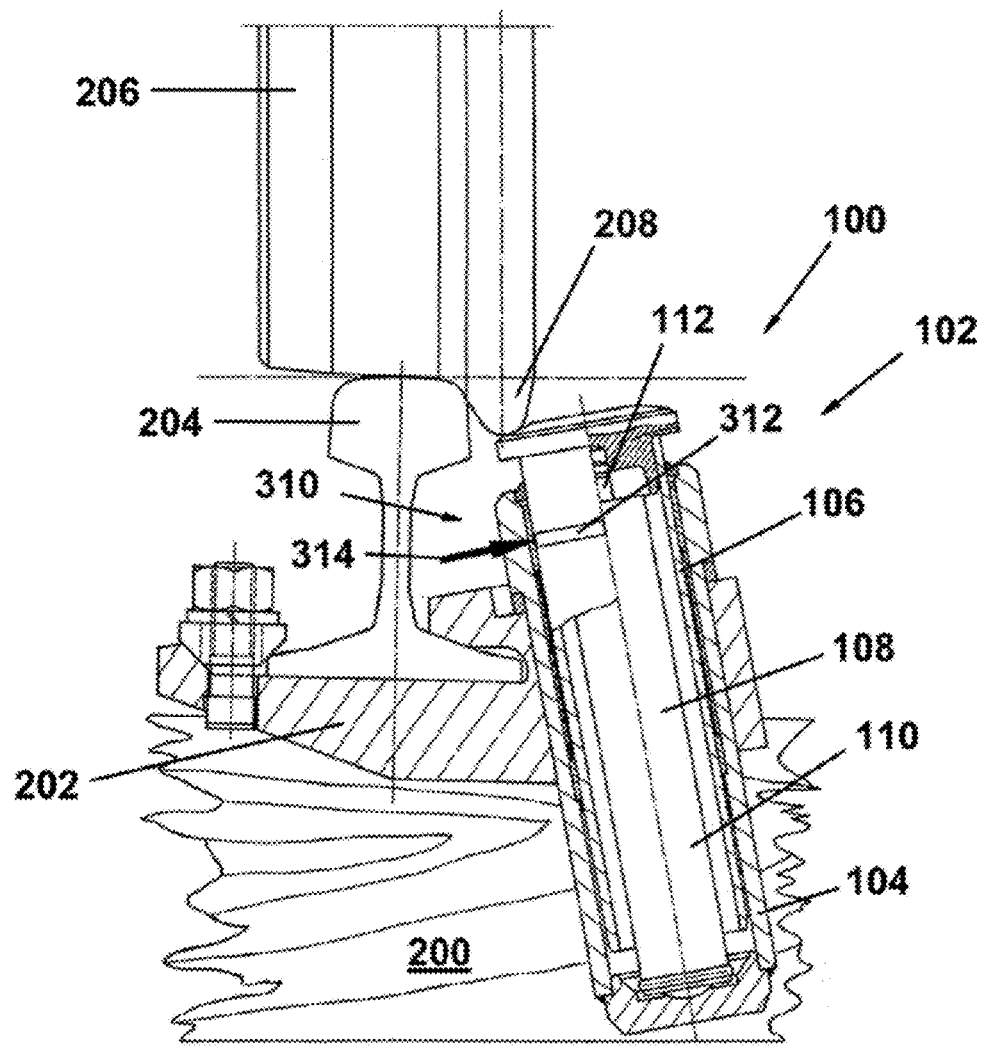
FIG. 1 is a schematic view of a rail brake damper according to the invention arranged in a track bed.

FIG. 1 generally denotes a rail brake damper according to the invention by 100. The rail brake damper 100 comprises a housing 102 having a bottom part 104 and a cover part 106 that is linearly displaceable relative to the bottom part 104. In the housing 102, a cylinder-piston arrangement 108 is housed, comprising a cylinder 110, which is operatively connected to the bottom part 104, and a piston rod 112, which is operatively connected to the cover part 106.

The rail brake damper 100 is arranged in a track bed 200. In particular, it is possible to see a rail 204 laid in the track bed 200 by means of a sleeper 202. FIG. 1 also shows a wheel 206 of a wagon (not shown), the wheel rim 208 of which acts directly on the rail brake damper 100.

The structure of the cylinder-piston arrangement 108 will now be described in detail with reference to FIGS. 2 and 3:

In the inner chamber of the cylinder 110, a piston 114 is received so as to be displaceable in the longitudinal direction L of the cylinder 110. The piston rod 112 attached to the piston 114 exits the cylinder 110 at the upper end 110a thereof in FIG. 2. In the process, the piston rod 112 is guided in the cylinder 110 by means of a guiding and sealing unit 116.

Two helical compression springs 118 and 120 act on the piston 114 on the side of the piston 114 remote from the piston rod 112, such that the free end of the piston rod 112 protrudes out of the cylinder 110 when in an initial state not influenced by external forces. This initial state is shown in FIG. 2.

Figure 2:
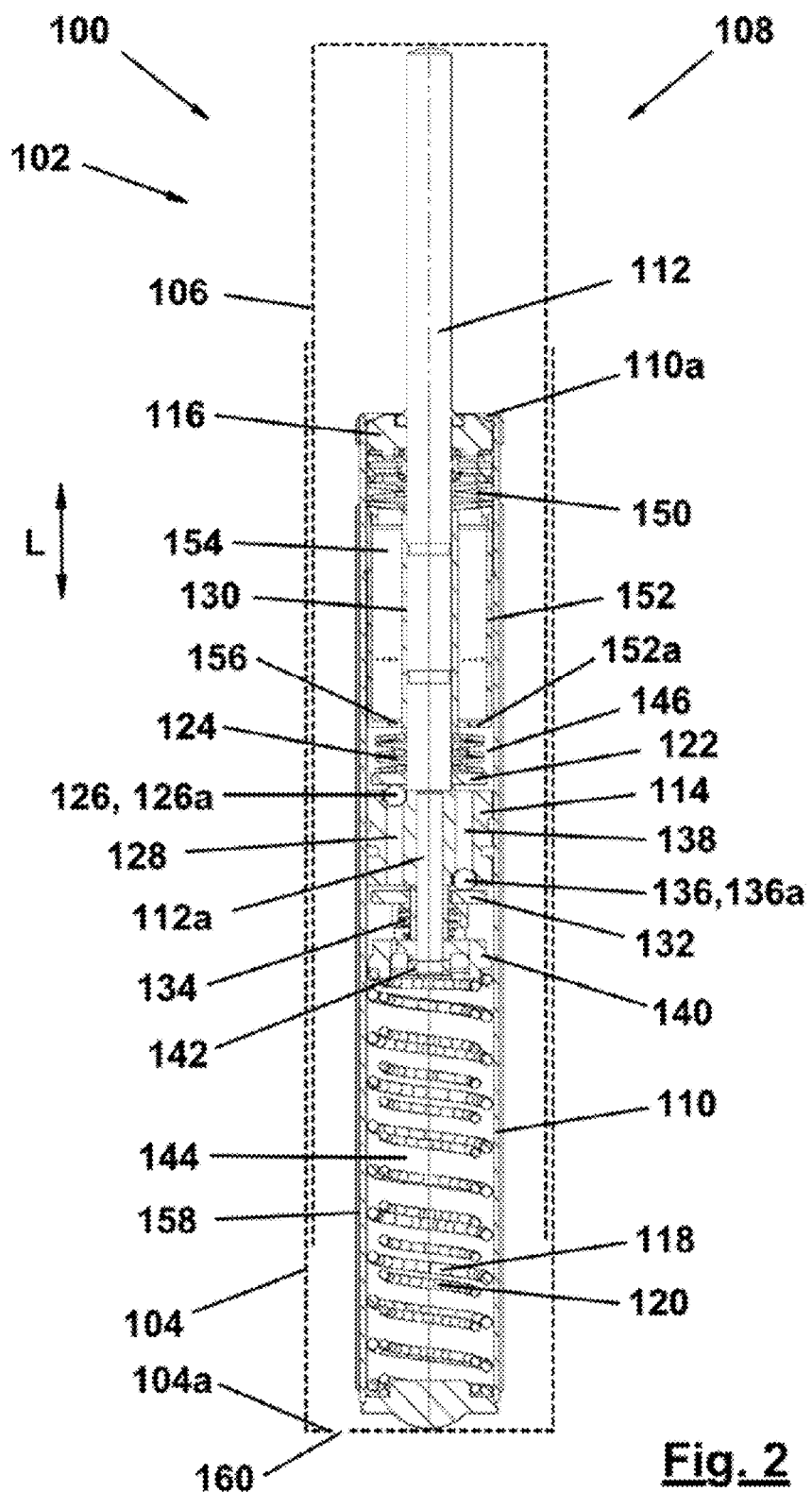
FIG. 2 is sectional view of the rail brake damper according to the invention.
Figure 3:
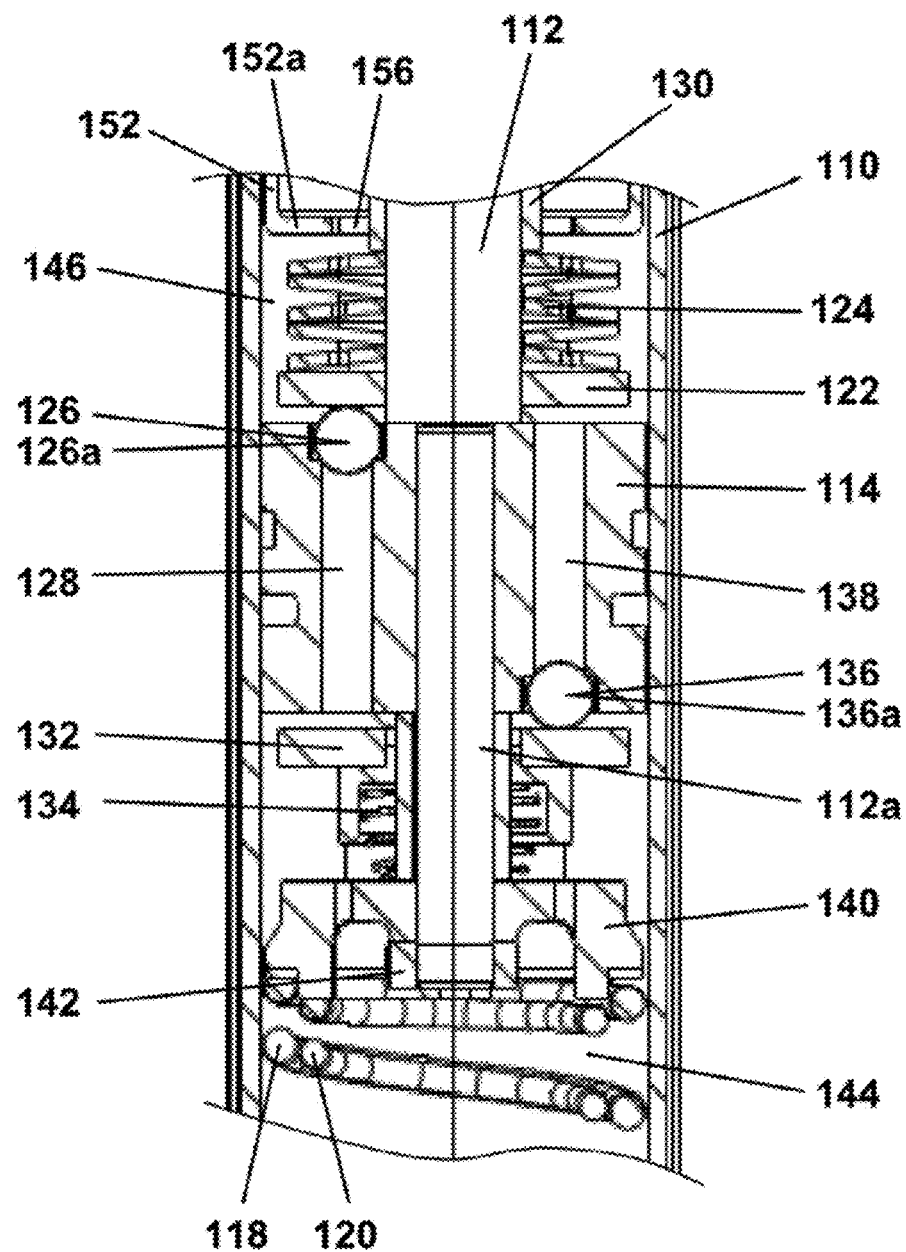
FIG. 3 is an enlarged sectional view of a detail from FIG. 2.

Above the piston 114 in FIG. 2, a support plate 122 is provided, which is biased towards the valve balls 126a of ball valves 126 (only one shown in FIG. 2) by means of a spring assembly 124. The ball valves 126 are used to close through-openings 128 in the piston 114, which pass through the piston 114 in the longitudinal direction L. Due to the valve balls 126a, there is always a predetermined minimum distance between the piston 114 and the support plate 122.

At its upper end, the spring assembly 124 is supported against a sleeve 130, which is connected to the piston rod 112 by crimping.

Below the piston 114 in FIG. 2, a support plate 132 is provided, which is biased towards the valve balls 136a of additional ball valves 136 (only one shown in FIG. 2) by means of a helical compression spring 134. The additional ball valves 136 are used to close through-openings 138 in the piston 114, which pass through the piston 114 in the longitudinal direction L. Due to the valve balls 136a, there is always a predetermined minimum distance between the piston 114 and the support plate 132.

At its lower end, the helical compression spring 134 is supported against an end element 140, which is operatively connected, by means of a nut 142, to a portion 112a of the piston rod 112 that passes through the piston 114.

If a wagon collides slowly with the free end of the piston rod 112 or of the cover part 106 and attempts to push the piston 114 into the cylinder 110, the ball valve 136 closes the through-opening 138 in the piston 114 whilst the ball valve 126 tends to open the through-opening 128. However, the valve plate 122, which holds the valve ball 126a on the valve seat of the ball valve 126 under the influence of the spring assembly 124, prevents the through-opening 128 from being opened. The closure force of the spring assembly 124 is selected such that the valve plate 122 is lifted off the piston 114 when a predetermined force, which is still smaller than the force that would cause the wagon to derail, is applied to the piston rod 112. After the ball valve 126 has been opened, hydraulic fluid can flow from the lower working chamber 144, through the clear holes 128 in the piston 114 and into the upper working chamber 146, such that the piston 114 is moved into the cylinder 110. Due to the slow movement of the wagon, the piston 114 is also moved into the cylinder 110 slowly, and so it is sufficient to only slightly lift the valve ball 126a off the piston 114. The result is a small opening cross section, meaning that the damper applies a predetermined damping force counter to the movement of the wagon.

If the wagon has passed the damper 100, and so no force is applied to the free end of the piston rod 112 again, the helical compression springs 118 and 120 push the piston 114 upwards again into the initial position shown in FIG. 2. In the process, the hydraulic fluid can flow from the upper working chamber 146, past the support plate 122, into the through-openings 138 in the piston 114 and into the lower working chamber 144 while opening the ball valves 136.

If a wagon collides quickly with the free end of the piston rod 112, the force required to open the ball valve 126 is reached more rapidly due to the greater dynamics, and so the blocked state does not occur or only occurs for a short time and the retraction of the piston rod 112 or piston 114 into the cylinder 110 is damped by the spring assembly 124 in cooperation with the valve plate 122. Due to the greater dynamics, the valve ball 126a is lifted off the piston 114 to an extent corresponding to such dynamics. Overall, an opening cross section that is dependent on the speed of the wagon is produced, and specifically such that the damping force is substantially independent of the speed. In this way, the maximum possible amount of kinetic energy can always be taken away from the wagon regardless of its speed.

If the wagon has passed the shock absorber, the free end of the piston rod 112 is extended out under the action of the helical compression springs 118 and 120.

In this case, the ball valve 126 closes the through-opening 128 in the piston 114 under the action of the spring assembly 124 whilst the ball valve 136 tends to open the through-opening 138. In practice, the ball valves 136 are not prevented from opening at all since the helical compression spring 134 is considerably weaker than the helical compression springs 118 and 120. After the ball valves 136 have been opened, hydraulic fluid can flow from the upper working chamber 146, through the clear holes 138 in the piston 114 and into the lower working chamber 144, such that the piston 114 is moved upwards. In the process, the damping provided by the helical compression spring 134 is selected such that the operational readiness of the rail brake damper 100 is restored as quickly as possible, but also such that the impact energy of the piston 114 and piston rod 112 on the upper end of the cylinder 110 is limited to a value that does not pose any risk of damage to the cylinder-piston arrangement 108.

In addition, at the upper end of the cylinder 110 a limit stop spring 150 is provided, which, in the embodiment shown, is also formed by a disc spring assembly like the spring assembly 124. When the piston rod 112 is being extended, said limit stop spring 150 interacts with the sleeve 130 operatively arranged on said piston rod.

In addition, an insert element 152 is arranged in the cylinder 110 adjacently to the upper end thereof, in which element there is a gas-filled equalisation space 154 used to hold the volume of hydraulic fluid displaced by the piston rod 112 as it moves into the cylinder 110. The lower end 152a of the insert element 152 in FIG. 2 surrounds the piston rod 112, or the sleeve 130 connected thereto, leaving a narrow gap 156. In this way, the lower end 152a of the insert element 152 keeps turbulent flows of hydraulic fluid, caused the piston 114 moving into the cylinder 110, away from the equalisation space 154 and thus prevents the hydraulic fluid from foaming at the gas-hydraulic fluid boundary.

It should be added that cooling ribs 158 are also provided on the outside of the cylinder 110 and that at least one opening 160 is provided in a lower boundary surface 104a of the bottom part 104. The air in the housing 102 can be driven out through said opening 160 when the cover part 106 is retracted into the bottom part 104, and fresh air can be sucked into the housing 102 when the cover part 106 extends out again. As a result, an air flow that moves past the cooling ribs 158 of the cylinder 110 is formed in the housing 102, thus ensuring effective cooling of the cylinder-piston arrangement 108.

To prevent the rail brake damper 100 from overheating as a result of a high number of activations in a short time, e.g. by the wagons being moved off a track by a shunting locomotive, various ancillary measures can be taken, which will be explained in more detail below with reference to FIGS. 1, 4a and 4b. In general, these may be the following: locking apparatuses 310 (see FIG. 1) and 320 (see FIG. 4a) which hold the piston rod 112 in its retracted state, damping-force reduction devices 330, 340 (see FIG. 4a) and 360, 370 (see FIG. 4b) associated with the at least one damping valve 126 and/or damping-force increasing devices 350 associated with the at least one additional damping valve 136 (see FIG. 4a).

At this juncture, it should be noted that these ancillary apparatuses can of course be used in various combinations with one another, despite being explained below in isolation, i.e. separately from one another, in terms of design and function.

The locking apparatus 310 according to FIG. 1 is designed to hold the piston rod 112, and thus the cover part 106 actuated by the wheel rim 208, in a retracted state such that no further activation processes of the rail brake damper 100 can take place. For this purpose, an annular groove 312 can be provided on the cover part 106 and used to latch a locking element 314. When the locking apparatus 310 is an activated state, the locking element 314 preferably abuts the cover part 106 in a spring-biased manner such that, when the piston rod 112 moves in the manner of a deflection, said element latches to the annular groove 312 when the groove reaches the appropriate position. As a result, a subsequent rebound of the piston rod 112 and thus of the cover part 106 is blocked until such time as the locking element 314 of the locking apparatus 310 moves back out of the annular groove 312 under the action of a control apparatus (not shown) and the movement of the cover part 106 is released again.

FIG. 4a shows another design variant of a locking apparatus of this kind. The locking apparatus 320 comprises an axial actuator 322, which can be formed as an actuating magnet, for example. The locking apparatus 320 further comprises a coupling element 324 that is connected to the end element 140 in an axially fixed manner and can be operatively connected to the axial actuator 322. If the piston rod 112 is in a retracted state, a frictional connection between the axial actuator 322 and the coupling element 324 is established by the axial actuator 322 being actuated by, for example, an external control unit (not shown), such that an extension movement of the piston rod 112 under the action of the helical compression springs 118 and 120 is prevented until such time as the frictional connection between the axial actuator 322 and coupling element 324 is undone again and the extension movement of the piston rod 112 is thus released in turn.

In addition, FIG. 4a shows a damping-force reduction device 330 associated with the at least one damping valve 126. The damping-force reduction device 330 comprises a ring motor 332, which is arranged in the region of the upper working chamber 146. In this case, the ring motor 332 can be actuated by, for example, an external control unit (not shown).

Furthermore, a threaded spindle 334 driven by the ring motor is provided and is displaceable axially along the main axis of the piston rod 112. The ring motor 332 is axially secured to the side facing away from the threaded spindle 334 by means of a sleeve 336 operatively connected to the piston rod 112. The threaded spindle 334 is operatively connected to the spring assembly 124 such that axially displacing the threaded spindle 334 along the main axis of the piston rod 112 can adjust, i.e. increase or decrease, the bias of the spring assembly 124 in a targeted manner. Lastly, due to the adjustability of bias of the spring assembly 124, the opening behaviour of the ball valve 126 and thus the damping force of the rail brake damper 100 in the manner of the deflection can be controlled in a targeted manner by means of the support plate 122. If the bias of the spring assembly 124 is selected to be very low, for example, there is only a very low damping force of the rail brake damper 100 in the manner of a deflection, which results in lower energy dissipation and thus lesser heating of the rail brake damper 100 even in the event of repeated activation processes in a short time.

Another possible embodiment, shown in FIG. 4a, of a damping-force reduction device 340 comprises an actively connectable bypass 342 towards a buffer container 344 (not shown) arranged outside the cylinder-piston arrangement 108. In this respect, the connection, i.e. the opening of the bypass 342, can be controlled, for example, by an external control device (not shown), which opens a valve 344 that can be actuated electrically and/or in a motorised manner and/or electromagnetically and/or pneumatically and/or hydraulically. When the bypass 342 towards the buffer container is in a connected or activated state, only a negligible hydraulic pressure is built up in the lower working chamber 144 when the piston moves 114 in the manner of a deflection, and so only a negligible damping action of the rail brake damper 100 occurs. In turn, this effect leads to lower energy dissipation and thus lesser heating of the rail brake damper 100.

Lastly, the rail brake damper 100 shown in FIG. 4a can additionally or alternatively comprise a damping-force increasing device 350, which is arranged in the region of the through-opening 138 in the piston 114, which opening is associated with the additional ball valve 136. For this purpose, a temperature-sensitive throttle 352, designed for example as an annular expansion wax cartridge or a shape-memory metal element, can be provided in the through-opening 138. When the rail brake damper 100 heats up due to a large number of activations, the temperature-sensitive throttle 352 expands and thus narrows the cross-sectional area available for the hydraulic fluid through the through-opening 138; as a result, only a relatively small amount of hydraulic fluid, or even no hydraulic fluid at all, can flow through the through-opening 138, thereby slowing down or even completely preventing a movement of the piston 114 in the manner of a rebound. Moreover, it is also possible to provide, additionally or alternatively, a temperature-sensitive helical compression spring 354 (e.g. a shape-memory metal spring) that replaces the helical compression spring 134 and axially expands when the temperature rises, thus increasing the force transmitted by the support plate 132 to the additional ball valve 136 in the manner of the closure. The effect of slowing down or preventing the piston 114 from extending out as the temperature rises can thus be achieved and/or heightened further. As a result, the heating up of the rail brake damper 100 can likewise be limited, thereby preventing damage due to thermal effects.

A temperature-sensitive valve element of this kind can also be used in the damping-force reduction device 340 instead of the valve element 344. FIG. 4b shows a damping-force reduction device 360 formed in this manner. In this device, the bypass 362 to the buffer container (not shown) is connected by means of the temperature-sensitive valve 364, which opens automatically when a predetermined temperature is reached, meaning that no energy and/or control signals have to be supplied.

FIG. 4b also shows a further embodiment of a damping-force reduction device 370. In this case, the damping-force reduction device 370 comprises a shape-memory metal sleeve 372, which is axially secured to the side facing away from the piston 114 by means of a sleeve 374 operatively connected to the piston rod 112. An expansion wax cartridge 376 is also provided, which expands axially along the main axis of the piston rod 112 as the temperature rises. The expansion wax cartridge 376 is operatively connected to the spring assembly 124. By the expansion wax cartridge 376 expanding due to a temperature rise, the bias of the spring assembly 124 can thus be reduced in a targeted manner, which ultimately leads to a reduced opening force of the ball valve 126. Consequently, the damping force of the rail brake damper 100 in the manner of the deflection is reduced automatically as the temperature increases, without any external control device, which ultimately leads to a merely negligible damping force of the rail brake damper 100 and ultimately constitutes a further option for preventing the rail brake damper 100 from heating up as a result of operation. Likewise, the bias of the spring assembly 124 increases again as the temperature drops, which leads to reinforcement of the damping function of the rail brake damper 100 and thus to its automatic reactivation.

The invention claimed is:

1. A rail brake damper comprising:
a cylinder-piston arrangement having
  a cylinder,
  a piston that is guided n the cylinder in an axially movable manner and divides the inner chamber of the cylinder into two working chambers,
  a piston rod connected to the piston and guided out of the cylinder at one end thereof in a sealed manner,
  an ejector arrangement, which acts on the piston in such a manner as to slide the piston rod out of the cylinder, and
  a damping device associated with the piston,
wherein the damping device comprises a damping valve having a piston channel which passes through the piston, thereby connecting the two working chambers, and a closure element associated with the piston channel,
the closure element being spring-biased in such a manner as to close the piston channel, and hydraulic pressure active in the working chamber remote from the piston rod acting on the closure element in such a manner as to open the damping valve,
wherein the closure element is formed as a ball that is made of metal or plastic,
wherein the piston channel is one of a plurality of piston channels connecting the working chambers that pass through the piston, the closure element is one of a plurality of closure elements and each of the piston channels is associated with a separate one of the closure elements,
wherein the closure elements associated with the plurality of piston channels are associated with a common support plate that is arranged above the piston and that is spring-biased against the closure elements by a valve-biasing spring in such a manner as to close the piston channels, and
wherein due to the closure elements, there is always a predetermined minimum distance between the piston and the common support plate.

2. The rail brake damper according to claim 1, wherein the valve-biasing spring is supported against an element that is operatively connected to the piston rod.

3. The rail brake damper according to claim 2, wherein an end, remote from the valve-biasing spring, of the element connected to the piston rod is configured to engage with a limit stop spring.

4. The rail brake damper according to claim 1, wherein, adjacently to an end of the cylinder at which the piston rod exits the cylinder, an insert element is arranged in the working chamber close to the piston rod.

5. The rail brake damper according to claim 1, wherein the damping device comprises an additional damping valve having an additional piston channel, which passes through the piston in such a manner as to connect the two working chambers, and an additional closure element associated with the additional piston channel, the additional closure element being spring-biased by an additional valve-biasing spring in such a manner as to close the additional piston channel, and hydraulic pressure active in the working chamber through which the piston rod passes acting on the additional closure element in such a manner as to open the additional damping valve.

6. The rail brake damper according to claim 5, wherein the additional piston channel is one of a plurality of additional piston channels connecting the working chambers that pass through the piston, the additional closure element is one of a plurality of additional closure elements and each of the piston channels is associated with a separate one of the additional closure elements, the additional closure elements being associated with an additional common support plate, on which the additional valve-biasing spring acts.

7. The rail brake damper according to claim 5, wherein the additional valve-biasing spring is supported against an element that is operatively connected to a portion of the piston rod that passes through the piston.

8. The rail brake damper according to claim 1, wherein the ejector arrangement comprises at least one ejector spring arranged in the working chamber remote from the piston rod, and/or at least one compressed-gas volume.

9. The rail brake damper according to claim 1, wherein the cylinder is formed having cooling ribs on its outer surface.

10. The rail brake damper according to claim 1, wherein the cylinder-piston arrangement is received in a housing that comprises a bottom part associated with the cylinder, and a cover part that is associated with the piston rod and is displaceable relative to the bottom part.

11. The rail brake damper according to claim 1, wherein the damping device comprises a damping-force reduction device associated with the damping valve configured to reduce the damping force of the damping valve when the temperature of the rail brake damper increases.

12. The rail brake damper according to claim 5, wherein the damping device comprises a damping-force increasing device associated with the additional damping valve configured to increase the damping force of the additional damping valve when the temperature of the rail brake damper increases.

13. The rail brake damper according to claim 1, wherein said damper comprises a locking apparatus configured to hold a unit formed by the piston and piston rod in a state in which the piston rod is inserted into the cylinder.

14. The rail brake damper according to claim 11, wherein the damping-force reduction device associated with the damping valve and/or a damping-force increasing device associated with an additional damping valve and/or a locking apparatus comprises an adjustment apparatus that adjusts automatically when the temperature changes.

15. The rail brake damper according to claim 11, wherein the damping-force reduction device associated with the damping valve and/or a damping-force increasing device associated with an additional damping valve and/or a locking apparatus comprises an adjustment apparatus that can be actuated electrically and/or in a motorised manner and/or electromagnetically and/or pneumatically and/or hydraulically.

* * * * *